United States Patent
Zhu et al.

(10) Patent No.: US 7,457,723 B2
(45) Date of Patent: Nov. 25, 2008

(54) SOFTWARE PERFORMANCE TESTING WITH MINIMUM ITERATIONS

(75) Inventors: Hui Zhu, Redmond, WA (US); Chris L. Barber, Redmond, WA (US); Ryan B. Beegle, Bothell, WA (US); Jeffrey S. Piira, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 496 days.

(21) Appl. No.: 11/365,163

(22) Filed: Mar. 1, 2006

(65) Prior Publication Data
US 2007/0220349 A1    Sep. 20, 2007

(51) Int. Cl.
*G06F 11/00* (2006.01)
(52) U.S. Cl. .................... 702/182; 709/201
(58) Field of Classification Search ......... 702/182–185, 702/188; 709/201, 212
See application file for complete search history.

(56) References Cited

U.S. PATENT DOCUMENTS

| | | | |
|---|---|---|---|
| 5,303,166 A | 4/1994 | Amalfitano et al. | 364/551.01 |
| 5,659,547 A | 8/1997 | Scarr et al. | 395/182.02 |
| 5,703,788 A | 12/1997 | Shei et al. | 364/488 |
| 6,002,869 A | 12/1999 | Hinckley | 395/704 |
| 6,298,317 B1 | 10/2001 | Wiemann | 703/22 |
| 6,304,982 B1 | 10/2001 | Mongan et al. | 714/38 |
| 6,701,514 B1 * | 3/2004 | Haswell et al. | 717/115 |
| 6,785,805 B1 | 8/2004 | House et al. | 713/1 |
| 6,975,965 B2 | 12/2005 | Jager et al. | 702/182 |
| 7,065,676 B1 * | 6/2006 | Lang et al. | 714/33 |
| 2002/0116153 A1 | 8/2002 | Wybouw-Cognard | 702/186 |
| 2005/0246390 A1 | 11/2005 | House et al. | 707/200 |

OTHER PUBLICATIONS

Hughes Software Systems, Test Automation, http://www.hssworld.com/whitepapers/whitepaper_pdf/test_automation.pdf, 14 pages.
"Maximising productivity through automated testing,"—Technology—Express Computer India, http://www.expresscomputeronline.com/20030901/technology01.shtml, 5 pages.
Test Automation, VeriTest: Test Automation, Automation Consulting, Offshore test automation, http://www.veritest.com/solutions/automation.asp, , 3 pages.
Dave Kelly, "Software Test Automation and the Product Life Cycle," http://wwww.mactech.com/articles/mactech/Vol.13/13.10/SoftwareTestAutomation/, 17 pages.

* cited by examiner

*Primary Examiner*—Edward Raymond
(74) *Attorney, Agent, or Firm*—Merchant & Gould (57) ABSTRACT

Systems and methods are disclosed for providing software performance testing. The results of a test may be determined valid if the test reached a defined test criteria after performing N number of iterations. If the test has not reached the defined test criteria and if N is less than a maximum value, one may be added to N and additional iteration of the test may be performed until the test reaches the defined test criteria or until N reaches the maximum value. If the test reaches the defined test criteria after any additional iteration of the test before N reaches the maximum value, the results of the test may be deemed valid. Moreover, if the test reached the defined test criteria with an outlier removed from the results, the results of the test may be deemed valid. Otherwise, the results of the test may be deemed invalid.

20 Claims, 4 Drawing Sheets

SOFTWARE PERFORMANCE TESTING WITH MINIMUM ITERATIONS

BACKGROUND

Software performance testing is a process for assessing a program's performance quality. In some situations, software performance testing may comprise repeatedly running a benchmarking test for a number of iterations. Results data is collected from the repeated benchmark tests and used to assess the tested program's performance quality. With this process, each test is repeated a number of iterations because, statistically, the more repeated and unbiased the tests are, the closer the average results data is to a "true" value. Thus, the conventional strategy is to choose an arbitrarily high maximum test iteration value to repeat the benchmarking test. This often causes problems because due to the limited resources, the greater the maximum test iteration value, the worse the efficiency. In other words, the greater the maximum test iteration value, the longer it takes to run the benchmarking test. Longer tests, for example, may require more in both hardware and personnel costs for running performance testing for assessing the tested program's performance quality.

In view of the foregoing, there is a need for methods and systems for providing software performance testing more optimally. Furthermore, there is a need for providing software performance testing with minimum iterations.

SUMMARY

Systems and methods are disclosed for providing software performance testing with minimized iterations. This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one embodiment, a method for providing performance testing may comprise performing N number of iterations of a test and then determining that results of the test are valid if the test reached a defined test criteria after performing the N number of iterations. However, if the test has not reached the defined test criteria and if N is less than a maximum value, the method may include adding one to N and performing an additional iteration of the test until the test reaches the defined test criteria or N reaches the maximum value. If the test reaches the defined test criteria after any additional iteration of the test before N reaches the maximum value, the results of the test are deemed valid. Moreover, the method includes, if the test reached the defined test criteria with an outlier removed from the results, determining that the results of the test are valid. Or, if N reached the maximum value and if the test did not reach the defined test criteria with an outlier removed from results, determining that the results of the test are invalid. In addition, the test may be deemed passing if the test results compare favorably to a goal value or deemed failing if the test results compare unfavorably to the goal value.

According to another embodiment, a system for providing software performance testing may comprise a memory storage and a processing unit coupled to the memory storage. The processing unit may be operative to perform N number of iterations of a test and to determine that results of the test are valid if the test reached a defined test criteria after performing the N number of iterations. The defined test criteria may comprise $$\frac{Err}{\overline{X}} \leq Z$$

where $\overline{X}$ is an average value of the results and Err is the error margin associated with the results. Furthermore, the processing unit may be operative to add, if the test has not reached the defined test criteria and if N is less than a maximum value, one to N and to perform an additional iteration of the test until the test reaches the defined test criteria or N reaches the maximum value. The results of the test may be deemed valid if the test reaches the defined test criteria after any additional iteration of the test before N reaches the maximum value. In addition, the processing unit may be operative to determine that the results of the test are valid if N reached the maximum value and if the test reached the defined test criteria with an outlier removed from the results. Moreover, the processing unit may be operative to determine that the results of the test are invalid if N reached the maximum value and if the test did not reach the defined test criteria with an outlier removed from results. In addition, the processing unit may be operative to deem the test as passing if the test results compare favorably to a goal value or deem the test as failing if the test results compare unfavorably to the goal value.

In accordance with yet another embodiment, a computer-readable medium which stores a set of instructions which when executed performs a method for providing software performance testing, the method executed by a set of instructions. The set of instructions may comprise performing N number of iterations of a test wherein the test is configured to measure the amount of time it takes for a computer program to perform a predetermined operation. In addition, the set of instructions may comprise determining that results of the test are valid if the test reached a defined test criteria after performing the N number of iterations. Moreover, the set of instruction may include adding, if the test has not reached the defined test criteria and if N is less than a maximum value, one to N and performing an additional iteration of the test until the test reaches the defined test criteria or N reaches the maximum value. If the test reaches the defined test criteria after any additional iteration of the test before N reaches the maximum value, the results of the test are deemed valid. Moreover, the set of instruction may include determining that the results of the test are valid if N reached the maximum value and if the test reached the defined test criteria with an outlier removed from the results. The outlier may comprise a data point within the results that is not in the range of [$\overline{X}$−Err,$\overline{X}$+Err] and the one most far away from a mean of the results where $\overline{X}$ is the average value of the results, and Err is the error margin associated with the results. Furthermore, the set of instruction may include determining that the results of the test are invalid if N reached the maximum value and if the test did not reached the defined test criteria with an outlier removed from results. The set of instruction may also include deeming the test as passing if the test results compare favorably to a goal value and deeming the test as failing if the test results compare unfavorably to the goal value.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

The following detailed description refers to the accompanying drawings. Wherever possible, the same reference numbers are used in the drawings and the following description to refer to the same or similar parts. While several exemplary embodiments of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding stages to the disclosed methods. Accordingly, the following detailed description does not limit the invention. Instead, the proper scope of the invention is defined by the appended claims.

Figure 1:
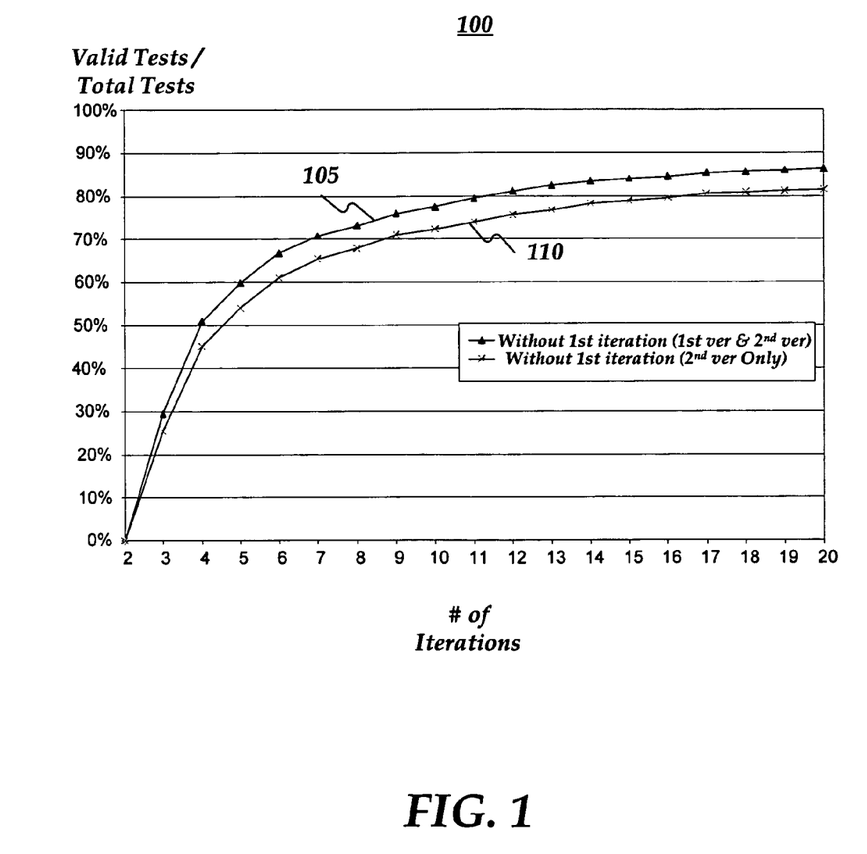
FIG. 1 is a diagram illustrating software performance testing results.

Systems and methods consistent with embodiments of the present invention provide software performance testing with minimum iterations. Embodiments of the invention may balance limited resources, efficiency, and accuracy for a benchmarking test. For example, embodiments of the invention may apply T-statistic concepts in order to dynamically decide how many iterations to use for a specific test and still receive credible results. Consequently, great efficiency improvements and machine time savings may be realized. FIG. 1 is a diagram illustrating software performance testing. Specifically, FIG. 1 shows a statistical analysis on a benchmark test of a particular software program. In this benchmark test, each test ran 20 iterations on different computers having different operating system versions and different amounts of random access memory. Each computer, however, had the same central processing unit (CPU) model and CPU speed. For example, a first curve 105 corresponds to those iterations in which both a first operating system version and a second operating system version were used. Second curve 110, however, corresponds to those iterations in which only the second operating system version was sued. In both first curve 105 and second curve 110, data from the first iteration was not used.

As shown in FIG. 1, 50% of the benchmark tests reach the test criteria (i.e. collected enough confidence data) within 4 iterations and 75% of the benchmark tests reach the test criteria within 10 iterations. Accordingly, running all the benchmark tests 20 iterations may not be necessary. From the data shown in FIG. 1, if each benchmark test were to stop when it reached the test criteria, machine runtime for the computers on which the benchmark test is being run could be cut 50%. Furthermore, as shown in FIG. 1, after 10 iterations, first curve 105 and second curve 110 each became substantially flat, which may indicate, for example, that there is a problem. The problem may comprise, for example, that the benchmark test is unstable, fluctuating due to other reasons, or may include another issues. Consequently, rerunning the benchmark test or running more iterations may not improve test results data for the benchmark test.

Embodiments of the invention may apply T-statistic concepts in order to dynamically decide how many iterations to use for a specific test. With the T-statistics concepts, a test is repeated N times. Also, it is assumed each test measurement is independent and unbiased. The N number of data, $(X_1, X_2, \ldots X_N)$, is called a sample. A sample has a sample mean $(\overline{X})$, a standard deviation (s), and a coefficient of variation (CV). Each of these is illustrated below:

$$\overline{X} = \frac{\sum_{i=1}^{N} X_i}{N}; s = \sqrt{\frac{\sum (X_i - \overline{X})^2}{N-1}}; \text{ and } CV = \frac{s}{\overline{X}}.$$

Assume the theoretical mean is $\mu$, by using t statistics, t value can be calculated using the following:

$$t = \frac{\overline{X} - \mu}{s/\sqrt{N}} = \frac{\sqrt{N}(\overline{X} - \mu)}{s}.$$

The idea behind t is to divide the difference between a sample and the theoretical quantity by a sample standard error. This type of calculation is called "studentizing". Thus theoretical mean $\mu$ can be calculated as:

$$\mu = \overline{X} - t \frac{s}{\sqrt{N}}.$$

Error Margin may be defined as:

$$Err = t \frac{s}{\sqrt{N}}.$$

For example, error margin can be used to measure how the data in the sample varies. Compared to the sample's standard deviation, error Margin may be a better concept as it considers, for example, the effect of sample size N. When N is small, the error margin is more related to standard deviation, but when N is large, the error margin is close to 0, regardless of the standard deviation's value. Consequently, this supports the assumption that the more repeated and unbiased the measurements are, the closer the average value is to a "true" value.

A confidence interval may be defined as $[\overline{X}-Err, \overline{X}+Err]$. The probability of theoretical mean $\mu$ falling into the confidence interval is called the "confidence level". For example, a 95% confidence interval may mean the probability of the theoretical mean $\mu$ falling into that region is 0.95. The data outside of the region $[\overline{X}-Err, \overline{X}+Err]$ are called outliers. Outliers may simply be the results of errors in measuring or recording the data, but they may also indicate changes in the process that lead to new discoveries. Outliers may be detected and investigated.

For a sample with N data, the degrees of freedom is N−1. With known degrees of freedom and the confidence level, t value can be found from a table of selected percentile of t distributions for selected degrees of freedom as shown in Table 1. As shown below, Table 1 lists the t value for 95% confidence interval.

TABLE 1

| Degrees of freedom | t value (95% confidence level) |
|---|---|
| 1 | 12.706 |
| 2 | 4.303 |
| 3 | 3.182 |
| 4 | 2.776 |
| 5 | 2.571 |
| 6 | 2.447 |
| 7 | 2.365 |
| 8 | 2.306 |
| 9 | 2.262 |
| 10 | 2.228 |
| 20 | 2.086 |
| 40 | 2.021 |
| 60 | 2 |
| Infinite | 1.96 |

An embodiment consistent with the invention may comprise a system for providing software performance testing with minimized iterations. The system may comprise a memory storage and a processing unit coupled to the memory storage. The processing unit may be operative to perform N number of iterations of a test and to determine that results of the test are valid if the test reached a defined test criteria after performing the N number of iterations. Furthermore, the processing unit may be operative to add, if the test has not reached the defined test criteria and if N is less than a maximum value, one to N and perform an additional iteration of the test until the test reaches the defined test criteria or N reaches the maximum value. The results of the test may be deemed valid if the test reaches the defined test criteria after any additional iteration of the test before N reaches the maximum value. In addition, the processing unit may be operative to determine that the results of the test are valid if N reached the maximum value and if the test reached the defined test criteria with an outlier removed from the results. Moreover, the processing unit may be operative to determine that the results of the test are invalid if N reached the maximum value and if the test did not reached the defined test criteria with an outlier removed from results. In addition, the processing unit may be operative to deem the test as passing if the test results compare favorably to a goal value or deem the test as failing if the test results compare unfavorably to the goal value.

Figure 2:
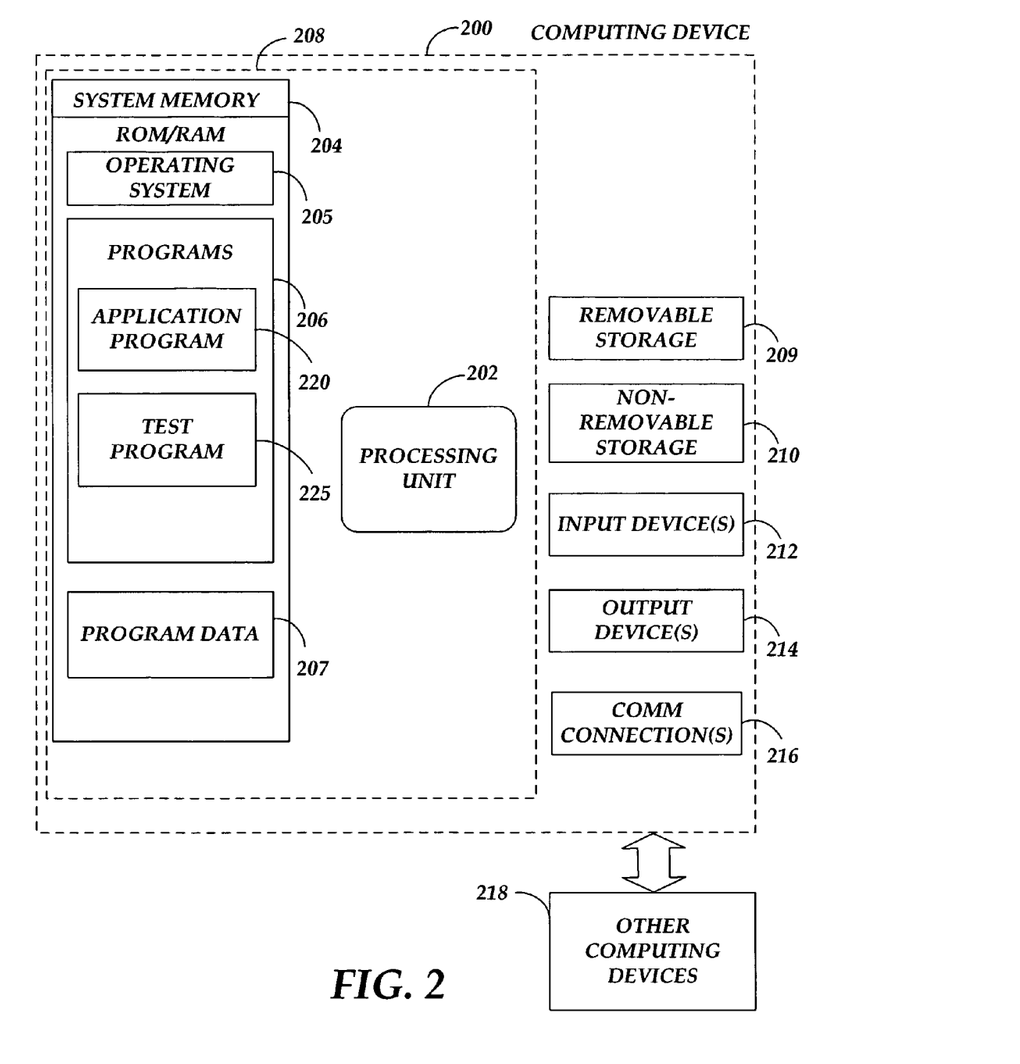
FIG. 2 is a block diagram of an exemplary system including a computing device consistent with an embodiment of the present invention.

FIG. 2 is a block diagram of an exemplary system including a computing device 200 consistent with an embodiment of the present invention. Consistent with an embodiment of the present invention, the aforementioned memory storage and processing unit may be implemented in a computing device, such as computing device 200 of FIG. 2. Any suitable combination of hardware, software, and/or firmware may be used to implement the memory storage and processing unit. By way of example, the memory storage and processing unit may be implemented with computing device 200 or any of other computing devices 218, in combination with computing device 200. The aforementioned system, device, and processors are exemplary and other systems, devices, and processors may comprise the aforementioned memory storage and processing unit, consistent with embodiments of the present invention.

With reference to FIG. 2, one exemplary system consistent with an embodiment of the invention may include a computing device, such as computing device 200. In a basic configuration, computing device 200 may include at least one processing unit 202 and a system memory 204. Depending on the configuration and type of computing device, system memory 204 may be volatile (such as RAM), non-volatile (such as ROM, flash memory, etc.) or some combination. System memory 204 may include operating system 205, one or more programs 206, and may include a program data 207. Operating system 205, for example, is suitable for controlling computing device 200's operation. In one embodiment, programming modules 206 may include application program 220 and test program 225. Furthermore, embodiments of the invention may be practiced in conjunction with a graphics library, other operating system, or any other application program and is not limited to any particular application or system. This basic configuration is illustrated in FIG. 2 by those components within a dashed line 208.

Computing device 200 may have additional features or functionality. For example, computing device 200 may also include additional data storage devices (removable and/or non-removable) such as, for example, magnetic disks, optical disks, or tape. Such additional storage is illustrated in FIG. 2 by a removable storage 209 and a non-removable storage 210. Computer storage media may include volatile and nonvolatile, removable and non-removable media implemented in any method or technology for storage of information, such as computer readable instructions, data structures, program modules, or other data. System memory 204, removable storage 209, and non-removable storage 210 are all examples of computer storage media (i.e memory storage.) Computer storage media may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 200. Any such computer storage media may be part of device 200. Computing device 200 may also have input device(s) 212 such as a keyboard, a mouse, a pen, a sound input device, a touch input device, etc. Output device (s) 214 such as a display, speakers, a printer, etc. may also be included. The aforementioned devices are exemplary and others may be used.

Computing device 200 may also contain a communication connection 216 that may allow device 200 to communicate with other computing devices 218, such as over a network in a distributed computing environment, for example, an intranet or the Internet. Communication connection 216 is one example of communication media. Communication media may typically be embodied by computer readable instructions, data structures, program modules, or other data in a modulated data signal, such as a carrier wave or other transport mechanism, and includes any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared, and other wireless media. The term computer readable media as used herein may include both storage media and communication media.

Figure 3:
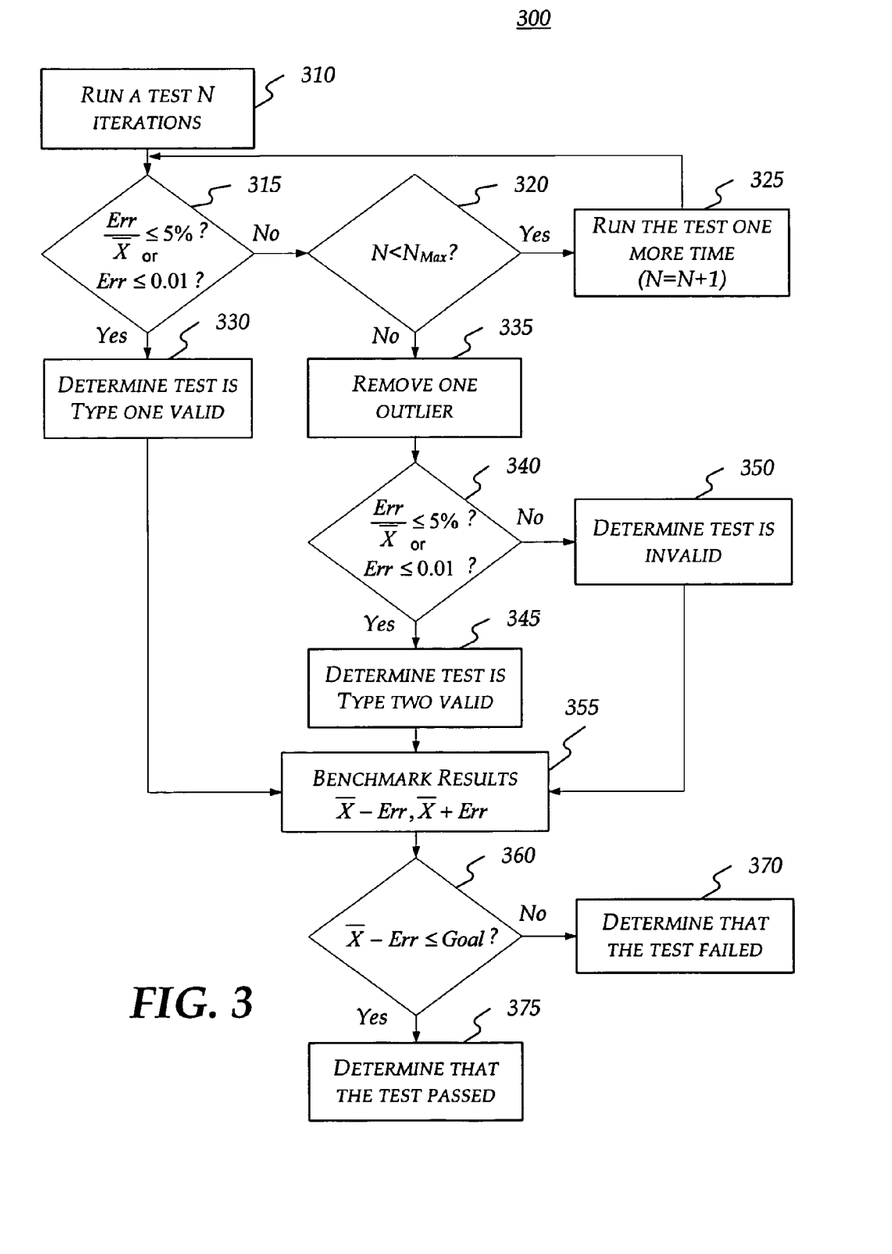
FIG. 3 is a flow chart of an exemplary method for providing software performance testing with minimum iterations consistent with an embodiment of the present invention.

As stated above, a number of program modules and data files may be stored in system memory 204, including operating system 205. While executing on processing unit 202, programs 206 may perform processes including, for example, one or more of the stages of method 300 as described below. The aforementioned process is exemplary, and processing unit 202 may perform other processes.

FIG. 3 is a flow chart setting forth the general stages involved in an exemplary method 300 for providing software performance testing using system 200 of FIG. 2. Exemplary ways to implement the stages of exemplary method 300 will be described in greater detail below. For example, test program 225 may run a benchmark test on application program 220 an initial N number of times. (Stage 310.) Past similar testing on similar computers testing similar software, for example, may be considered in determining an initial value for N. The test ran by test program 225 may comprise determining the time it takes application program 220 to open a document on removable storage 209 or non-removable storage 210. The aforementioned test is exemplary and other tests may be performed.

Consistent with an embodiment of the invention the ultimate number of test iterations ran by test program 225 may be as small as possible while still allowing test program 225 to collect enough confidents data to reach a defined test criteria. As described above, from the aforementioned statistical analysis, the smaller an error margin, the closer the average sample value is to a "true" quantity. Also, a smaller error margin may mean less variation among the data within a sample. Consequently, in order to decide a minimum number of iterations to run test program 225, a goal may be to make the error margin as small as possible. Accordingly, the criteria to determine if the benchmark test has collected enough data may comprise:

$$\frac{Err}{\overline{X}} \leq 5\% \text{ or } Err \leq 0.01 \text{ (i.e. } \overline{X} \leq 0.2s);$$

where $\overline{X}$ is the average value from a sample, and Err is the error margin with 95% confidence level. In other words, the criteria may comprise the probability of a "true" value falling into the range $[\overline{X}-Err, \overline{X}+Err]$ is 0.95 or 95%.

The aforementioned criteria specifies that the ratio of the error margin to the average value should be less than or equal to 5%, or the error margin should be no greater than 0.01 s. If the average value is less than 0.2 s, which is below the measurement time, the ratio of Err to $\overline{X}$ is not required to be less than 5%, as long as the Err is no greater than 0.01 s. Also, the error margin is related to the confidence level, for example, the higher the confidence level, the wider the range the error margin has. 95% may be chosen because a confidence level may be obtained as high as possible while the error margin is still in a reasonable range. The aforementioned confidence level is exemplary and other confidence levels may be used.

After running test program 225 N iterations (stage 310), the results may be tested against the aforementioned criterion. (Stage 315.) If the criterion is not met (stage 315), N may be incremented, test program 225 may run the test one more time, and the new results may again be tested against the aforementioned criterion (stage 315.) Test results that fulfill the criteria within a limited maximum number of iterations (e.g. $N_{Max}$) are called type one valid. (Stage 330.)

As the first iteration may be discarded, at least 3 data points, for example, may be need to give a reasonable error margin. Also, from the analysis illustrated in FIG. 1, within 4 iterations, 50% of the benchmark tests reached the criteria. Accordingly, the initial N number (e.g. used in stage 310) may be set at 4. $N_{Max}$ (i.e. the maximum number of iterations) can be user defined or specified by a default value. Due to resource limitations, $N_{Max}$ may be set at 10, for example. The aforementioned values for initial N number and $N_{Max}$ are exemplary and others may be used. For example, past similar testing on similar computers testing similar software may be considered in determining values for initial N number and $N_{Max}$.

For those tests still failing the criteria after $N_{Max}$ has been met, there may be a special case that during the previous iterations, a spike, for example, may have occurred. This spike may have occurred because of some illegitimate conditions or problems. Consequently, the test may be valid even after removing a data outlier associated with the spike. Accordingly, in order to avoid forcing users to investigate a false problem, a special rule may be set. This rule may comprise, for example, if a test reaches $N_{Max}$ and is still failing the criteria (stage 320), the worst data outlier may be removed (stage 335.) For example, the worst outlier may be defined as $X_i$, which is not in the range of $[\overline{X}-Err, \overline{X}+Err]$ and the one most far away from the mean (e.g. the biggest$|X_i-\overline{X}|$). The data left after the worst outlier is removed may be re-calculated as a new sample with the results of this recalculation applied to check if the test is valid or not (stage 340.) If the re-calculated results are valid, then the test is deemed type two valid (stage 345), if not, then the test is deemed invalid (stage 350.)

Next, the benchmark test results are reported (stage 355.) For example, the result of a test with N iterations may be reported as $\overline{X}\pm Err$, where $\overline{X}$ is the average value of the sample, and Err is the error margin with 95% confidence level. This means, for example, the probability of a "true" value fall into the range of $[\overline{X}-Err, \overline{X}+Err]$ is 0.95. The aforementioned result is exemplary and other results may be reported. Furthermore, the results' validity level may be also be reported. For example, the validity levels as described above with respect to stages 330, stage 345, and stage 350 may be reported. Type one valid, for example, may indicate that the benchmark test passed the criteria within limited iterations limited by $N_{max}$. Type two valid may indicate that the benchmark test reached $N_{max}$, but did not pass the criteria, however, after removing the worst outlier, the test did pass the criteria. And invalid may indicate that the test reached $N_{max}$ and even after removing the worst outlier, the test still failed the criteria. Furthermore, the benchmark result may still be $\overline{X}\pm Err$ with no outliner removed, regardless of the reported validity level. When a user wants to check the details of a test result, all the data (e.g. the data associated with the from 1 to N iterations) may be shown, no matter if the results are type one valid, type two valid, or invalid. With type two valid, the removed outlier may be identified.

Figure 4A:
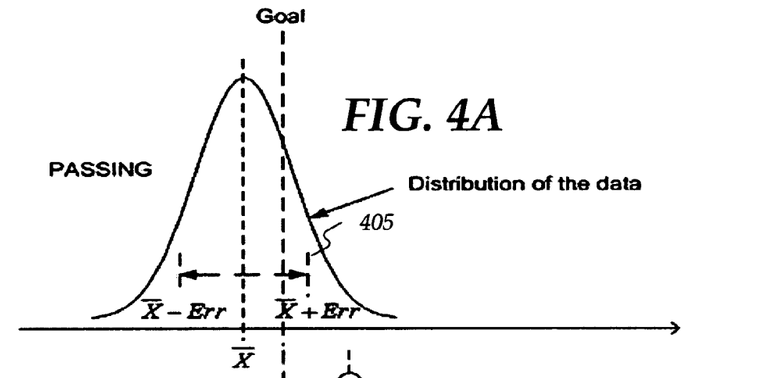
FIGS. 4a through 4c are diagrams illustrating software performance testing results consistent with an embodiment of the present invention.
Figure 4B:
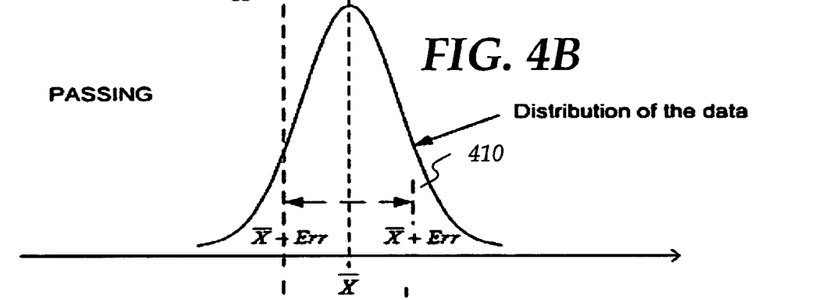
Figure 4C:
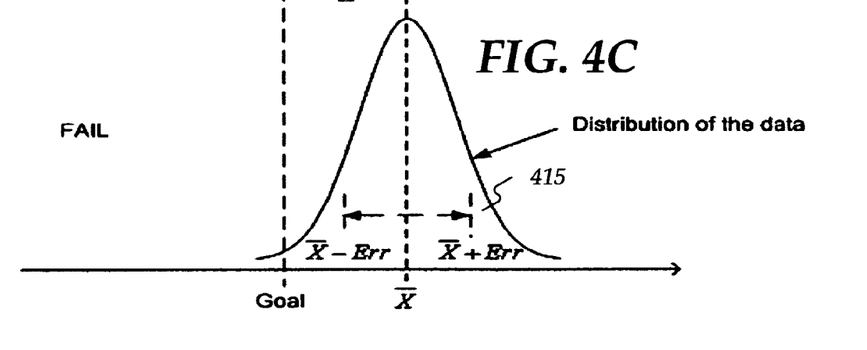

After the benchmark test results are reported (stage 355), the test result $[\overline{X}-Err, \overline{X}+Err]$ may then be compared to a predefined goal (stage 360.) The predefined goal may be user determined from user input or may comprise a default value. Either way, past similar testing on similar computers testing similar software may be considered in determining values for the predefined goal. For example, if ($\overline{X}-Err \leq Goal$), then the benchmark test may be deemed as passing (stage 375.) Otherwise, the benchmark test may be deemed as failing (stage 370.) As stated above, the test ran by test program 225 may comprise determining the time it takes application program 220 to open a document on removable storage 209 or non-removable storage 210. $\overline{X}$ may comprise 5 seconds and Err may comprise 0.02. If the goal is 6 sec, then the test may be deemed passing. If however, the goal is 4.7 sec., then the test may be deemed as failing. FIG. 4A and FIG. 4B illustrate examples in which ($\overline{X}$–Err$\leq$Goal) is true and thus illustrates data associated with a passing benchmark test. FIG. 4C illustrates an example in which ($\overline{X}$–Err$\leq$Goal) is not true and thus illustrates data associated with a failing benchmark test.

Subsequently, the majority of performance issue may be indicated in the tests deemed failing or in the tests deemed passing but invalid. In these cases a coding problem or a memory usage problem may be causing the problem. Accordingly, a priority for investigating performance issues may be established as shown in Table 2 below. The highest priority may go to those tests in which the data is valid, but the test is still deemed as failing. The next highest may comprise the situation where the data is invalid and the test is deemed failing. The priority may then comprise investigating those cases where the data is invalid be the test is deemed passing. If it is valid and passing, investigation may be optional.

TABLE 2

| Validity/Passing Level | Investigation Priority Level |
| --- | --- |
| Type 1 or 2 valid, but test failing | Investigation priority 1 |
| Invalid and Failing | Investigation priority 2 |
| Invalid and Passing | Investigation priority 3 |
| Type 1 or 2 valid, and the test Passing | Investigation optional |

Generally, consistent with embodiments of the invention, program modules may include routines, programs, components, data structures, and other types of structures that perform particular tasks or implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention are described above with reference to block diagrams and/or operational illustrations of methods, systems, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

While certain features and embodiments of the invention have been described, other embodiments of the invention may exist. Furthermore, although embodiments of the present invention have been described as being associated with data stored in memory and other storage mediums, aspects can also be stored on or read from other types of computer-readable media, such as secondary storage devices, like hard disks, floppy disks, or a CD-ROM, a carrier wave from the Internet, or other forms of RAM or ROM. Further, the stages of the disclosed methods may be modified in any manner, including by reordering stages and/or inserting or deleting stages, without departing from the principles of the invention.

It is intended, therefore, that the specification and examples be considered as exemplary only, with a true scope and spirit of the invention being indicated by the following claims and their full scope of equivalents. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for providing performance testing, the method comprising:
performing N number of iterations of a test;
determining that results of the test are valid if the test reached a defined test criteria after performing the N number of iterations;

adding, if the test has not reached the defined test criteria and if N is less than a maximum value, one to N and performing an additional iteration of the test until one of the following occurs: the test reaches the defined test criteria and N reaches the maximum value, wherein if the test reaches the defined test criteria after any additional iteration of the test before N reaches the maximum value, the results of the test are deemed valid;

determining that the results of the test are valid if N reached the maximum value and if the test reached the defined test criteria with an outlier removed from the results;

determining that the results of the test are invalid if N reached the maximum value and if the test did not reach the defined test criteria with an outlier removed from results;

deeming the test as passing if the test results compare favorably to a goal value; and deeming the test as failing if the test results compare unfavorably to the goal value.

2. The method of claim 1, wherein the test is configured to measure the amount of time it takes for a computer program to perform a predetermined operation.

3. The method of claim 1, wherein performing N number of iterations of the test comprises performing N number of iterations of the test wherein N is initially set to a minimum value determined from historic data.

4. The method of claim 1, wherein performing N number of iterations of the test comprises performing N number of iterations of the test wherein N is initially set to a minimum value comprising the number of iterations it took 50% of historic benchmark tests to reach their test criteria.

5. The method of claim 1, wherein the defined test criteria comprises:

$$\frac{Err}{\overline{X}} \leq Z;$$

where $\overline{X}$ is an average value of the results, and Err is the error margin associated with the results.

6. The method of claim 1, wherein the maximum value for N is set to a value determined from historic data.

7. The method of claim 1, wherein the maximum value for N is set to a value comprising the number of iterations it took 75% of historic benchmark tests to reach their test criteria.

8. The method of claim 1, wherein the goal value comprises a time period a computer program is tested for by the test to determine if the computer program can perform a predetermined operation within.

9. A system for providing software performance testing, the system comprising:

a memory storage; and a processing unit coupled to the memory storage, wherein the processing unit is operative to:

perform N number of iterations of a test;

determine that results of the test are valid if the test reached a defined test criteria after performing the N number of iterations wherein the defined test criteria comprises $$\frac{Err}{\overline{X}} \leq Z$$

where $\overline{X}$ is an average value of the results and Err is the error margin associated with the results;

add, if the test has not reached the defined test criteria and if N is less than a maximum value, one to N and perform an additional iteration of the test until one of the following occurs: the test reaches the defined test criteria and N reaches the maximum value, wherein if the test reaches the defined test criteria after any additional iteration of the test before N reaches the maximum value, the results of the test are deemed valid;

determine that the results of the test are valid if N reached the maximum value and if the test reached the defined test criteria with an outlier removed from the results;

determine that the results of the test are invalid if N reached the maximum value and if the test did not reach the defined test criteria with an outlier removed from results;

deem the test as passing if the test results compare favorably to a goal value; and deem the test as failing if the test results compare unfavorably to the goal value.

10. The system of claim 9, wherein N is initially set to a minimum value comprising the number of iterations it took 50% of historic benchmark tests to reach their test criteria.

11. The system of claim 9, wherein Z is less than or equal to 5%.

12. The system of claim 9, wherein the maximum value for N is set to a value determined from historic data.

13. The system of claim 9, wherein the maximum value for N is set to a value comprising the number of iterations it took 75% of historic benchmark tests to reach their test criteria.

14. The system of claim 9, wherein the outlier comprises a data point within the results that is not in the range of [$\overline{X}$−Err, $\overline{X}$+Err] and the one most far away from a mean of the results where $\overline{X}$ is the average value of the results, and Err is the error margin associated with the results.

15. A computer-readable medium which stores a set of instructions which when executed performs a method for providing software performance testing, the method executed by the set of instructions comprising:

performing N number of iterations of a test wherein the test is configured to measure the amount of time it takes for a computer program to perform a predetermined operation;

determining that results of the test are valid if the test reached a defined test criteria after performing the N number of iterations;

adding, if the test has not reached the defined test criteria and if N is less than a maximum value, one to N and performing an additional iteration of the test until one of the following occurs: the test reaches the defined test criteria and N reaches the maximum value, wherein if the test reaches the defined test criteria after any additional iteration of the test before N reaches the maximum value, the results of the test are deemed valid;

determining that the results of the test are valid if N reached the maximum value and if the test reached the defined test criteria with an outlier removed from the results wherein the outlier comprises a data point within the results that is not in the range of [$\overline{X}$−Err,$\overline{X}$+Err] and the one most far away from a mean of the results where $\overline{X}$ is the average value of the results, and Err is the error margin associated with the results;

determining that the results of the test are invalid if N reached the maximum value and if the test did not reach the defined test criteria with an outlier removed from results;

deeming the test as passing if the test results compare favorably to a goal value; and deeming the test as failing if the test results compare unfavorably to the goal value.

16. The computer-readable medium of claim 15, wherein performing N number of iterations of the test comprises performing N number of iterations of the test wherein N is initially set to a minimum value determined from historic data.

17. The computer-readable medium of claim 15, wherein performing N number of iterations of the test comprises performing N number of iterations of the test wherein N is initially set to a minimum value comprising the number of iterations it took 50% of historic benchmark tests to reach their test criteria.

18. The computer-readable medium of claim 15, wherein the defined test criteria comprises:

$$\frac{Err}{\overline{X}} \leq 5\%;$$

where $\overline{X}$ is an average value of the results, and Err is the error margin associated with the results.

19. The computer-readable medium of claim 15, wherein the maximum value for N is set to a value determined from historic data.

20. The computer-readable medium of claim 15, wherein the maximum value for N is set to a value comprising the number of iterations it took 75% of historic benchmark tests to reach their test criteria.

* * * * *